United States Patent Office 3,754,028
Patented Aug. 21, 1973

3,754,028
GLYCOLIC ACID PRODUCTION
Seymour J. Lapporte, Orinda, and William G. Toland, San Rafael, Calif., assignors to Chevron Research Company, San Francisco, Calif.
No Drawing. Filed Aug. 21, 1972, Ser. No. 282,617
Int. Cl. C07c 59/06
U.S. Cl. 260—535 R    9 Claims

ABSTRACT OF THE DISCLOSURE

Glycolic acid, formic acid and acetic acid are produced by the reaction of formaldehyde, carbon monoxide and water in the presence of catalytic amounts of a Group VIII noble transition metal compound and an iodide promoter.

DESCRIPTION OF THE PRIOR ART

The preparation of glycolic acid from formaldehyde, carbon monoxide, and water in the presence of acidic catalysts at high pressures and temperatures is disclosed in Noler, "Chemistry of Organic Compounds," page 743, 2nd Edition, 1957, W. B. Saunders Co., Philadelphia, Pa.

The preparation of α-hydroxypropionic acid from acetaldehyde, carbon monoxide and water in the presence of acidic catalysts at high pressures and temperatures is disclosed in U.S. Pat. No. 2,265,945, issued Dec. 9, 1941, to D. J. Loder.

DESCRIPTION OF THE INVENTION

The catalyst system

The catalyst system employed in the process of the present invention comprises a Group VIII noble transition metal compound and iodide promoter.

Suitable Group VIII transition metal compounds include rhodium, ruthenium, palladium, iridium and platinum compounds. Examples of suitable rhodium compounds include rhodium halides, such as $RhCl_3$, $RhBr_3$ and $RhI_3$; rhodium carbonyl halides, such as $$Rh_2(CO)_4Br_2$$

$Rh_2(CO)_4Cl_2$ and $Rh_2(CO)_4I_2$; and $Rh_2O_3$. Other suitable rhodium compounds are rhodium coordination compounds containing monodentate ligands, such as carbon monoxide, halides, amines, organophosphines, organoarsines and/or organostibines, i.e, rhodium compounds such as $$Rh[(C_6H_5)_3P]_2(CO)I$$

$RhCl(CO)[(C_6H_5)_3As]_2$. Examples of ruthenium compounds include ruthenium trichloride, ruthenium dicarbonyl and diiodide. Examples of palladium and platinum compounds include palladium oxide, platinum oxide, palladium acetate $Pd[(n-C_4H_9)_3P](CO)Cl_2$, and palladium nitrate. Examples of iridium compounds include iridium trichloride, $Ir_2(CO)_4I_2$, and iridium nitrate.

The preferred Group VIII transition metal compounds are rhodium and palladium compounds. The particularly preferred transition metal compounds are rhodium compounds, especially rhodium halide and rhodium carbonyl halide compounds.

Suitable iodide promoters include iodine, hydrogen iodide (hydroiodic acid) and alkyl iodides of 1 to 6 carbon atoms and 1 to 3 iodide groups such as methyl iodide, ethyl iodide, methylene diiodide, iodoform, and isopropyl iodide.

Certain transition metal compounds such as $$RhI[(C_6H_5)_3P]_3,$$

$RhI_3$, $RuI_3$, $Ru(CO)_2I_2$, and $IrI_3$ incorporate iodide moieties so that a separate iodide promoter may not be required.

The catalyt system of a Group VIII transition metal compounds and an iodide promoter is a known catalyst combination and disclosed, for example, in U.S. 3,579,551 and U.S. 3,579,552, issued to Craddock et al. on May 18, 1971, and Canadian Pat. No. 837,640, issued to Paulik et al. on Mar. 24, 1970. The disclosures of these patents are hereby incorporated by reference.

Molar ratios of the iodide promoter to the transition metal component of the catalyst system in the range of 1:1 to 2500:1 are generally suitable. However, the preferred molar ratios of iodide promoter to transition metal component are about 3:1 to 300:1 and the most preferred molar ratios are about 5:1 to 100:1.

Concentrations of the transition metal compound of the catalyst system in the reaction medium between $10^{-6}$ moles/liter and $10^{-1}$ moles/liter are normally employed, with the preferred range being $10^{-4}$ moles/liter to $10^{-2}$ moles/liter. Higher concentrations even to the extent of 1 mole/liter may, however, be used if desired.

The concentration of the iodide promoter portion of the catalyst system in the reaction medium may vary widely over the broad concentration range of $10^{-6}$ moles/liter to 18 moles/liter, based on iodide atom. In the process of this invention, however, the preferred concentration range of promoter is $10^{-4}$ moles/liter to 2 moles/liter.

Although the catalyst system is generally employed as a homogeneous catalyst system, components of the catalyst system, e.g., the transition metal compound, may be dispersed on inert supports, such as silica or alumina, to provide a heterogeneous catalyst system.

The carbon monoxide reactant

The carbon monoxide is employed in the process at partial pressures of from about 1 p.s.i.a. to about 2000 p.s.i.a., although partial pressures of about 25 p.i.s.a. to 1000 p.s.i.a. are preferred. Carbon monoxide streams containing inert impurities such as carbon dioxide, hydrogen, methane, nitrogen and paraffinic hydrocarbons having 1 to 4 carbon atoms may be employed, if desired.

The formaldehyde reactant

The formaldehyde reactant is suitably introduced in the pure form or produced in situ, e.g., from paraformaldehyde or trioxane. In the preferred modification of the process, the formaldehyde is provided in the form of trioxane.

Reaction conditions

The reactants employed in the process of the invention are generally contacted in the molar ratios defined by the stoichiometry of Equation 1:

$$CH_2O + CO + H_2O \rightarrow HOCH_2CO_2H \qquad (1)$$

That is, the molar ratio of carbon monoxide to formaldehyde and the molar ratio of water to formaldehyde are substantially equimolar (e.g., 1.5:1 to 1:1.5). However, an excess of water, carbon monoxide or formaldehyde is suitably employed. For example, in some modifications of the process, suitable molar ratios of carbon monoxide to formaldehyde and molar ratios of water to formaldehyde are from 10:1 to 1:10, preferably from 5:1 to 1:2.

The process of the invention is conducted in a fluid phase, i.e., either in the gaseous or liquid phase, in the presence or in the absence of an inert reaction diluent. Suitable inert normally-liquid diluents are hydrocarbons free from aliphatic unsaturation such as hexane, heptane, octane, decane, cyclohexane, benzene, toluene and xylene. Suitable normally-gaseous diluents are nitrogen, hydrogen, argon, helium, methane and ethane. As indicated above, in some modifications of the process, a portion of the carbon monoxide reactant suitably serves as the reaction diluent. When diluent is employed, up to about 50 moles per mole of formaldehyde reactant are satisfactory. The process is suitably conducted in an inert reaction environment so that the presence of reactive materials such as oxygen is desirably avoided.

The process of the invention is carried out by intimately contacting the formaldehyde, water and carbon monoxide in the presence of the transition metal catalyst and the iodide promoter. A variety of procedures can be employed for contacting the reaction components with the catalyst system. In one modification, the entire amounts of formaldehyde, water, carbon monoxide and catalyst components are charged to an autoclave or similar pressure reactor and maintained at reaction conditions for the desired reaction period. In another modification, an active catalyst system is initially preformed by contacting at elevated temperature the transition metal compound, carbon monoxide and iodide promoter in a suitable solvent and subsequently adding the remaining reaction components. In certain modifications wherein a supported transition metal catalyst is employed, the reaction is effected in a continuous manner as by passing a mixture of the reaction components through a reactor in which the supported transition metal catalyst is maintained.

The process of the invention is conducted at moderate temperatures and pressures. Suitable reaction temperatures varying from about 100° C. to 300° C. are satisfactory and reaction temperatures varying from about 150° C. to 250° C. are preferred. The process is conducted at or above atmospheric pressure, and pressures from about 1 atmosphere to about 20 atmospheres are satisfactory.

At the conclusion of the reaction, the product mixture is separated and the glycolic acid product is recovered by conventional means such as fractional distillation. In addition to glycolic acid, the process of the invention also produces other useful products such as formic acid and acetic acid as major products. Such products are also separated and recovered from the product mixture by conventional procedures.

EXAMPLE 1

A 1-liter magnetically stirred autoclave was charged with 0.001 mole of rhodium trichloride, sealed and flushed with nitrogen followed by carbon monoxide. Trioxane (1 mole), water (3.2 moles), and hydroiodic acid (0.05 mole) were then charged to the autoclave. The autoclave was sealed, pressured to 1,000 p.s.i.g. with carbon monoxide and rapidly heated to 150° C. The autoclave was maintained at 150° C. for 20.5 hours. The autoclave was then cooled to room temperature and opened, and the reaction mixture was analyzed by nuclear magnetic resonance spectroscopy, infrared spectroscopy and gas-liquid chromatography.

Glycolic acid was formed in 23% yield, based on trioxane charged. Acetic acid (63% yield) and formic acid (14% yield) were also formed as major products.

EXAMPLE 2

A 1-liter magnetically stirred autoclave was charged with 0.001 mole of rhodium trichloride, sealed and flushed with nitrogen followed by carbon monoxide. Trioxane (1 mole), water (3 moles), and methylene diiodide (0.025 mole) were then charged to the autoclave. The autoclave was sealed, pressured to 1,000 p.s.i.g. with carbon monoxide and rapidly heated to 150° C. After maintaining the autoclave at 150° C. for 20 hours, the autoclave was cooled and opened. The reaction mixture was analyzed by nuclear magnetic resonance spectroscopy and gas-liquid chromatography.

Glycolic acid was formed in 23% yield, based on trioxane charged. Acetic acid (51%) and formic acid (26%) were also formed as major products.

EXAMPLE 3

A 1-liter magnetically stirred autoclave was charged with 0.001 mole palladium dichloride, sealed and flushed with nitrogen followed by carbon monoxide.

Trioxane (1 mole), water (3 moles), and hydroiodic acid (0.05 mole) were then charged to the autoclave. The autoclave was sealed, pressured to 1,000 p.s.i.g. with carbon monoxide and rapidly heated to 150° C. After maintaining the autoclave at 150° C. for 17 hours, the autoclave was cooled and opened. The reaction mixture was analyzed by nuclear magnetic resonance spectroscopy and gas-liquid chromatography.

Glycolic acid was formed in 39% yield, based on trioxane charged. Acetic acid (6%) and formic acid (55%) were also formed as major products.

We claim:

1. A process of producing glycolic acid which comprises reacting formaldehyde, carbon monoxide and water in the presence of catalytic amounts of a Group VIII noble transition metal compound, and an iodide promoter, the molar ratio of water to formaldehyde being from about 1:1.5 to 1.5:1 at a temperature of from about 50° C. to 300° C. and a carbon monoxide partial pressure of from about 1 p.s.i.a. to 2000 p.s.i.a.

2. The process of claim 1 wherein the transition metal compound is a rhodium or palladium compound.

3. The process of claim 2 wherein the rhodium or palladium compound is a rhodium or palladium halide.

4. The process of claim 2 wherein the molar ratio of carbon monoxide to formaldehyde is from about 5:1 to 1:2 and the molar ratio of water to formaldehyde is from about 5:1 to 1:2.

5. The process of claim 4 wherein the rhodium compound is rhodium trichloride.

6. The process of claim 4 wherein the formaldehyde is provided in the form of trioxane.

7. The process of claim 4 wherein the iodide promoter is hydroiodic acid or an alkyl iodide.

8. The process of claim 4 wherein the palladium halide is palladium dichloride.

9. The process of claim 1 wherein the product mixture comprises glycolic acid, acetic acid and formic acid as products.

References Cited

UNITED STATES PATENTS 3,579,551   5/1971   Craddock et al. _____ 260—413

FOREIGN PATENTS 508,383   6/1959   Great Britain _____ 260—535

LORRAINE A. WEINBERGER, Primary Examiner

P. J. KILLOS, Assistant Examiner

U.S. Cl. X.R.

260—541, 542